(12) United States Patent
Hoekstra

(10) Patent No.: US 6,408,126 B1
(45) Date of Patent: Jun. 18, 2002

(54) OPTICAL WAVEGUIDE COMPONENT

(75) Inventor: Tsjerk Hans Hoekstra, Edinburg (GB)

(73) Assignee: JDS Uniphase Inc., Nepean ( * ) Notice: Subject to any disclaimer, the term of this patent is extended or adjusted under 35 U.S.C. 154(b) by 0 days.

(21) Appl. No.: 09/538,594

(22) Filed: Mar. 24, 2000

Related U.S. Application Data

(63) Continuation-in-part of application No. PCT/EP99/04040, filed on Jun. 9, 1999.

(30) Foreign Application Priority Data

Jul. 24, 1998 (NL) .......................................... 98202496

(51) Int. Cl.$^7$ ................................................ G02B 6/00
(52) U.S. Cl. ....................................... 385/143; 385/130
(58) Field of Search ................................ 385/143, 131, 385/130, 129, 132, 147, 37, 145; 359/288

(56) References Cited

U.S. PATENT DOCUMENTS 5,633,966 A * 5/1997 Nakaishi ....................... 385/37
5,861,976 A * 1/1999 Hoekstra ..................... 385/131
6,229,949 B1 * 5/2001 Ido et al. ..................... 385/145

FOREIGN PATENT DOCUMENTS

EP 94 202 305.2 8/1994 ............. G02F/1/29
EP WO 97/01782 1/1997 ............. G02B/6/12

OTHER PUBLICATIONS

International Search Report for PCT/EP99/04040.
First page of published Application WO 00/07049, for PCT/EP99/04040.

* cited by examiner

Primary Examiner—Phan T. H. Palmer
(74) Attorney, Agent, or Firm—Lacasse & Associates, LLC

(57) ABSTRACT

The invention pertains to an optical waveguide component comprising a substrate, a core-matching refractive index lower cladding layer, a core layer, a core-matching refractive index upper cladding layer, a low refractive index upper cladding, wherein the core-matching refractive index lower cladding layer is deposited directly onto the substrate and has a thickness sufficient to avoid substantial capture and/or absorption by the substrate of a guided mode in the core layer, whereas slab modes, quasi-guided modes and/scattered light leak to the substrate. The components according to the invention allow high switching speeds and high confinement of a guided mode on the one hand and, on the other hand, absorption by the substrate of stray-light and radiation modes, which, in turn, leads to improved optical devices, such as optical switches with improved isolation.

20 Claims, 1 Drawing Sheet

OPTICAL WAVEGUIDE COMPONENT

RELATED APPLICATIONS

This application is a CIP of PCT application PCT/EP99/04040 filed Jun. 9, 1999.

BACKGROUND OF THE INVENTION

1. Field of the Invention

The invention pertains to an optical waveguide component comprising a substrate, a core-matching refractive index lower cladding layer, a core layer, a core-matching refractive index upper cladding layer, and a low refractive index top cladding.

2. Description of the Related Art

Such a component is known from, e.g., International patent application WO 97/01782. This publication concerns optical components having an at least penta-layered polymer structure on a substrate comprising: a) a low refractive index bottom cladding layer, b) a core-matching refractive index lower cladding layer, c) a core layer, d) a core-matching refractive index upper cladding layer, and e) a low refractive index top cladding layer.

With this specific layer structure optimum confinement in the direction of the thickness of the stack of layers (also denoted as transverse direction} can be obtained, which results in less loss of light and an improved switching efficiency. However, present and future applications of optical devices require crosstalk to be as low as possible.

BRIEF SUMMARY OF THE INVENTION

Accordingly, it is an object of the present invention to further reduce crosstalk. This is achieved, in the components described in the first paragraph, by leaving out the low refractive index bottom cladding layer and employing a single core-matching refractive index lower cladding layer which has a thickness sufficient to avoid substantial capture and/or absorption by the substrate of a guided mode in the core layer, whereas slab modes, quasi-guided modes and/scattered light leak to the substrate.

It was found that, in the penta-layered components, slab modes, quasi-guided modes and/or scattered light (sometimes also referred to as radiation modes and stray light respectively) become trapped between the lower and upper cladding layers, with the core layer and the core-matching refractive index cladding layers serving as a (composite) core. By leaving out the bottom cladding layer, making sure that the slab modes, quasi-guided modes and/or scattered light leak to the substrate, and selecting the thickness of the core-matching refractive index tower cladding layer such that substantial absorption of a guided mode by the substrate is avoided, crosstalk and other detrimental phenomena are significantly reduced. Once captured or absorbed by the substrate, the said modes cannot have any interaction with the guide mode(s) in the core layer and a decrease of the optical performance is avoided. E.g., for an 1×2 optical switch, avoiding interaction between a guided mode in the core layer and slab modes, quasi-guided modes and/scattered light will result in a considerably improved isolation (defined as the ratio of the optical power in an output in the on-state and the optical power in an output in the off-state).

Capture and/or absorption of the guided mode should preferably be smaller than 0.01 dB/cm, more preferably smaller than 0.001 dB/cm.

Leaking of slab modes, quasi-guided modes and/or scattered light to the substrate can be achieved by using a substrate that has a refractive index higher than that of the core-matching refractive index lower cladding layer and/or that functions as an absorber of the said undesirable modes. Any material that absorbs and dissipates light in the optical frequencies used in the structure in question will do. Examples of suitable materials are metals such as titanium, silver, gold, or nickel or non-transparent dielectric polymers containing a dye. It is noted that the substrate may comprise one or more (usually very thin) top layers or coatings, e.g., to promote adhesion to the core-matching refractive index lower cladding layer.

The components according to the invention allow high switching speeds and high confinement of a guided mode, require less power for switching and, due to the capture or absorption by the substrate of slab modes, quasi-guided modes and/or scattered light, exhibit less crosstalk.

It is noted that EP 642 052 discloses a polymeric thermo-optical device comprising a polymeric core layer sandwiched between two cladding layers having a refractive index lower than that of the guiding layer. A heating element is placed against one of the cladding layers and this layer has a lower refractive index than the other cladding layer. In a particularly preferred embodiment, the lower cladding layer is made up of two sublayers to provide optical isolation from the substrate. Thus, the gist of EP 642 052 runs counter to that of the present invention.

DETAILED DESCRIPTION OF THE INVENTION

Figure 1:
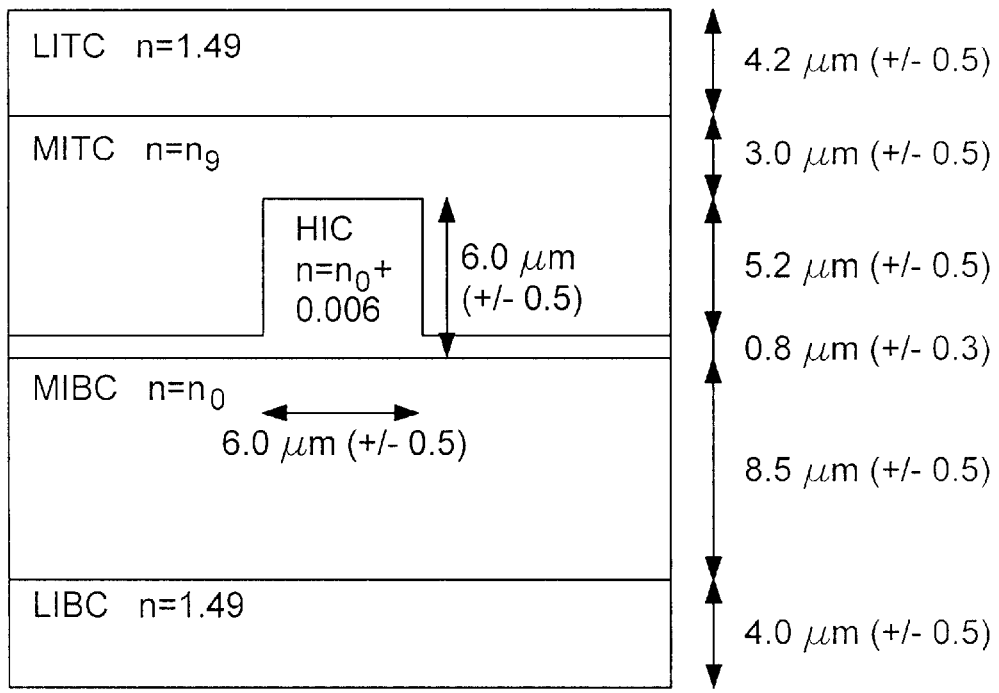
FIG. 1 shows a polymeric five- or penta-layered structure on a silicon substrate in accordance with the prior art.

In a preferred embodiment, the component is a thermo-optical component and/or the thickness of the core-matching refractive index lower cladding layer is (preferably at least 30 percent) greater than the thickness of the stack containing the core layer, the core-matching refractive index upper cladding layer, and the low refractive index upper cladding. Thus, the core layer is asymmetrically buried in the layer stack, close to the heater element and far from the heatsink, i.e. the substrate.

As will be clear from the above explanations, it is advantageous to select the refractive index of the substrate to be higher than the refractive index of the core-matching refractive index lower cladding layer. Silicon substrates are preferably used, because silicon exhibits a very high refractive index and silicon substrates are readily available on the market and of homogeneous thickness. Furthermore, they are frequently used in integrated circuit techniques and apparatus.

Within the framework of the present invention, components wherein the layers are made of optical polymeric materials are preferred. Active optical components, such as 1×N switches, switch matrices, and MZIs, can be, e.g., so-called thermo-optical (TO) components, which are preferred, or electro-optical components (EO). Both thermo-optical and electro-optical components are known.

The working of thermo-optical components is based on the phenomenon of the optical waveguide material employed exhibiting a temperature dependent refractive index. On top of the upper cladding layer heating elements are provided (usually metal strips) to heat the polymeric cladding and core materials, in order to change the refractive index for switching.

The working of electro-optical devices is based on the phenomenon of the non-linear optically active material employed exhibiting an electric field dependent refractive index. On top of the upper cladding layer electrodes are provided to apply an electric field to the non-linear optically active material to change the refractive index for switching.

Of course, the invention also applies to passive components, like splitters and combiners.

Devices according to the invention can be used with advantage in optical communications networks of various kinds. Generally, the optical components either will be directly combined with optical components such as light sources (laser diodes) or detectors, or they will be coupled to input and output optical fibres, usually glass fibres.

Polymer optical devices are commonly optical fibre-compatible and based on embedded or embedded ridge-type channel waveguides. The resulting structure comprises a high refractive index core polymer (usually of rectangular or square cross-section) embedded in a lower refractive index cladding material.

Suitable materials for and configurations of the cladding and the core layers are disclosed, int. al., in M. B. J. Diemeer et al., "Polymeric phased array wavelength multiplexer operating around 1550 nm," *Electronics Letters*, Vol. 32 (1996), pp. 1132–1133; and T. A. Tumolillo et al., "Solid State Optical Space Switches for Network Cross-Connect and Protection Applications," *IEEE Communications Magazine* (1997), pp 124–130; and International Patent Application WO 97/01782.

Within the framework of the present invention the term "core-matching refractive index" means that the refractive index is matched to that of the core so as to obtain the required contrast.

Figure 2:
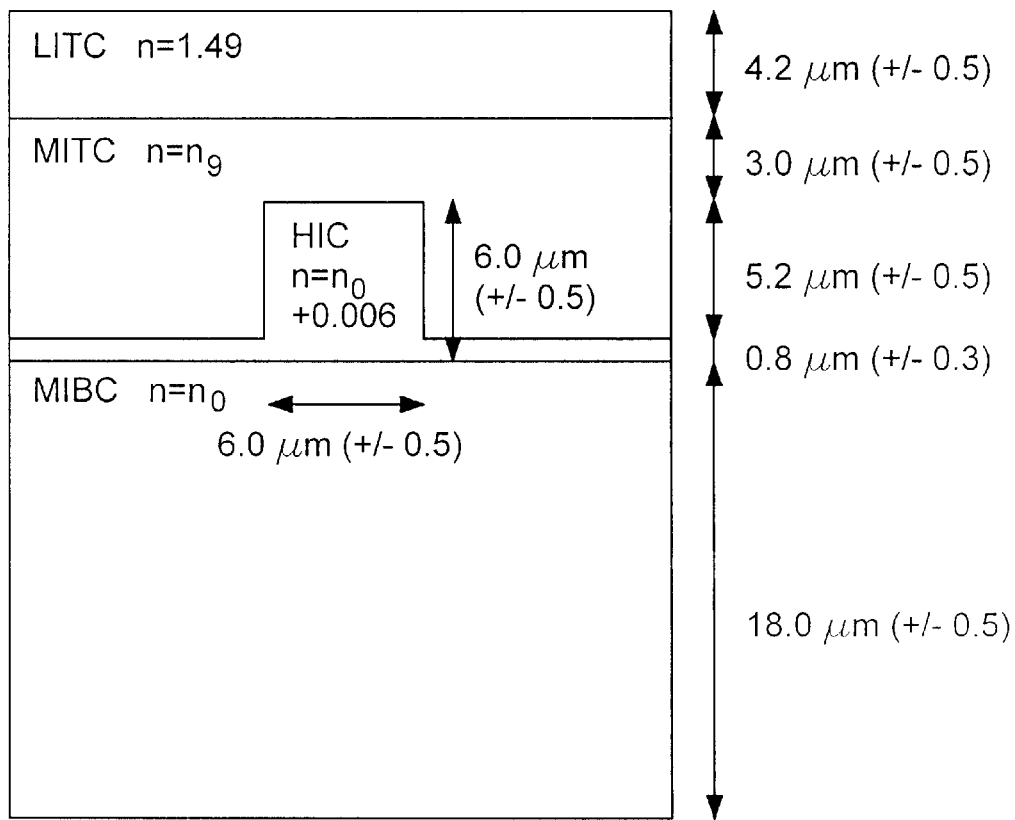
FIG. 2 shows a polymeric four-layered structure on a silicon substrate in accordance with the present invention.

FIG. 1 shows a polymeric five- or penta-layered structure on a silicon substrate in accordance with the prior art. FIG. 2 shows a polymeric four-layered structure on a silicon substrate in accordance with the present invention (in both structures N0 equals 1.513). Both devices were operated using light having a wavelength of 1550 nm and, in comparison with the one according to FIG. 1, the scattered light in the device according to the present invention was considerably reduced.

What is claimed is:

1. An optical waveguide component comprising a substrate, a core-matching refractive index lower cladding layer, a core layer, a core matching retractive index upper cladding layer, and a low retractive index top cladding, characterised in that the core-matching refractive index lower cladding layer is deposited directly onto the substrate and has a thickness sufficient to avoid substantial capture and/or absorption by the substrate of a guided mode in the core layer, whereas slab modes, quasi-guided modes and/or scattered light leak to the substrate.

2. The optical waveguide component according to claim 1 wherein the component is a thermo-optical component.

3. The optical waveguide component according to claim 2 wherein the thickness of the core-matching refractive index lower cladding layer is greater that the thickness of the stack containing the core layer, the core-matching refractive index upper cladding layer, and the low refractive index upper cladding.

4. The optical waveguide component according to claim 3 wherein the thickness of the core-matching refractive index lower cladding layer is at least 30 percent greater than the thickness of the said stack.

5. The optical waveguide component according to claim 4 wherein the layers are made of polymeric materials.

6. The optical waveguide component according to claim 4 wherein the component comprises a switch.

7. The optical waveguide component according to claim 3 wherein the layers are made of polymeric materials.

8. The optical waveguide component according to claim 7 wherein the component comprises a switch.

9. The optical waveguide component according to claim 2 wherein the layers are made of polymeric materials.

10. The optical waveguide component according to claim 2 wherein the component comprises a switch.

11. The optical waveguide component according to claim 1 wherein the thickness of the core-matching refractive index lower cladding layer is greater that the thickness of the stack containing the core layer, the core-matching refractive index upper cladding layer, and the low refractive index upper cladding.

12. The optical waveguide component according to claim 11 wherein the thickness of the core-matching refractive index lower cladding layer is at least 30 percent greater than the thickness of the said stack.

13. The optical waveguide component according to claim 12 wherein the layers are made of polymeric materials.

14. The optical waveguide component according to claim 13 wherein the component comprises a switch.

15. The optical waveguide component according to claim 12 wherein the component comprises a switch.

16. The optical waveguide component according to claim 11 wherein the layers are made of polymeric materials.

17. The optical waveguide component according to claim 11 wherein the component comprises a switch.

18. The optical waveguide component according to claim 1 wherein the layers are made of polymeric materials.

19. The optical waveguide component according to claim 18 wherein the component comprises a switch.

20. The optical waveguide component according to claim 1 wherein the component comprises a switch.

* * * * *

UNITED STATES PATENT AND TRADEMARK OFFICE
CERTIFICATE OF CORRECTION

PATENT NO.   : 6,408,126 B1
DATED        : June 18, 2002
INVENTOR(S)  : Hoekstra It is certified that error appears in the above-identified patent and that said Letters Patent is hereby corrected as shown below:

Column 3,
Line 42, "N0 equals" should read -- $N_0$ equals --

Signed and Sealed this

Twenty-third Day of July, 2002

Attest:

Attesting Officer

JAMES E. ROGAN
Director of the United States Patent and Trademark Office